Dec. 25, 1962 J. S. ATOLS 3,069,818
CENTERING DEVICE
Filed Nov. 27, 1959 2 Sheets-Sheet 1
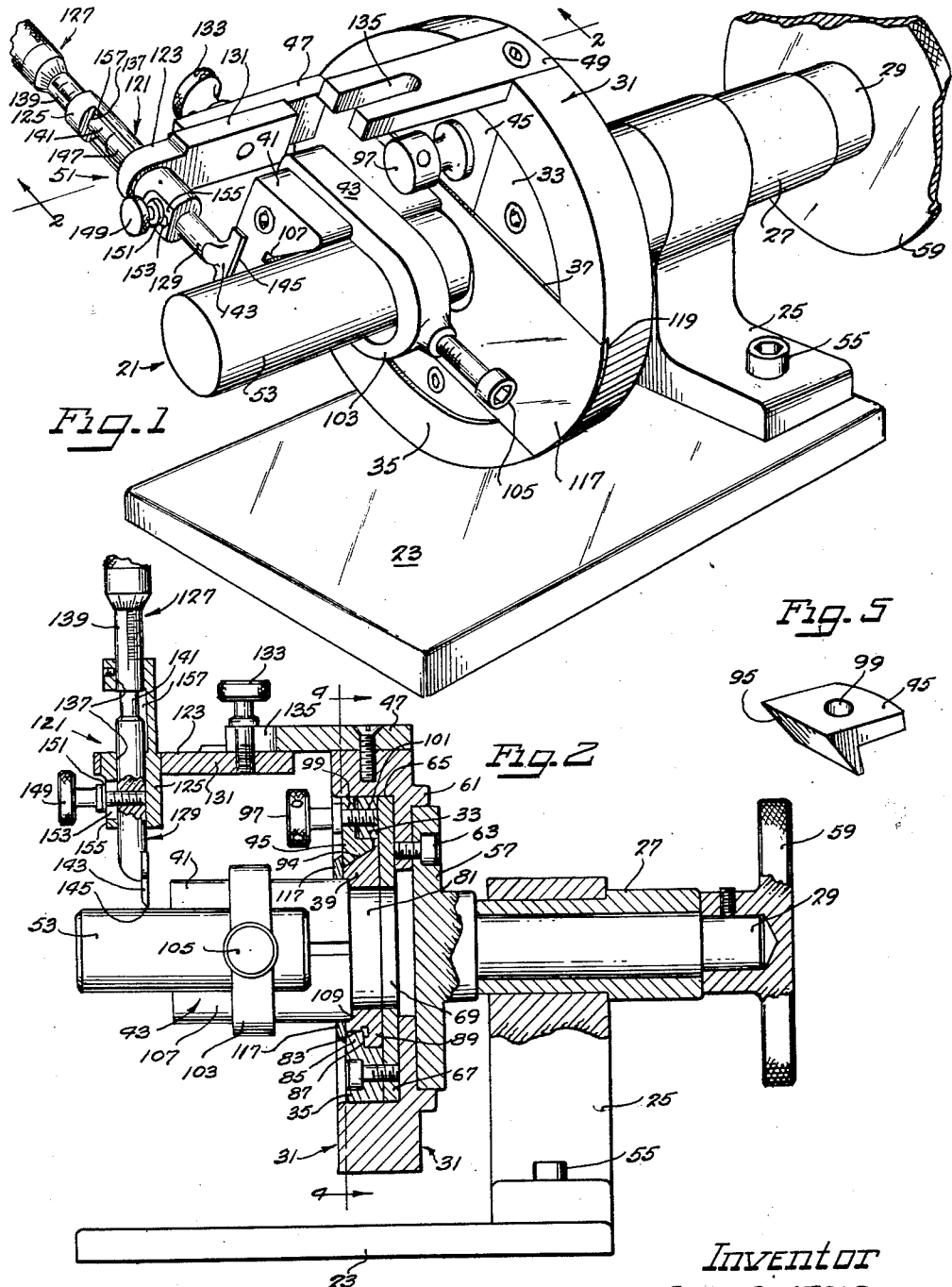
Inventor
JOHN S. ATOLS.
By Soans, Anderson, Luedeka & Fitch
Attys Dec. 25, 1962 J. S. ATOLS 3,069,818
CENTERING DEVICE
Filed Nov. 27, 1959 2 Sheets-Sheet 2
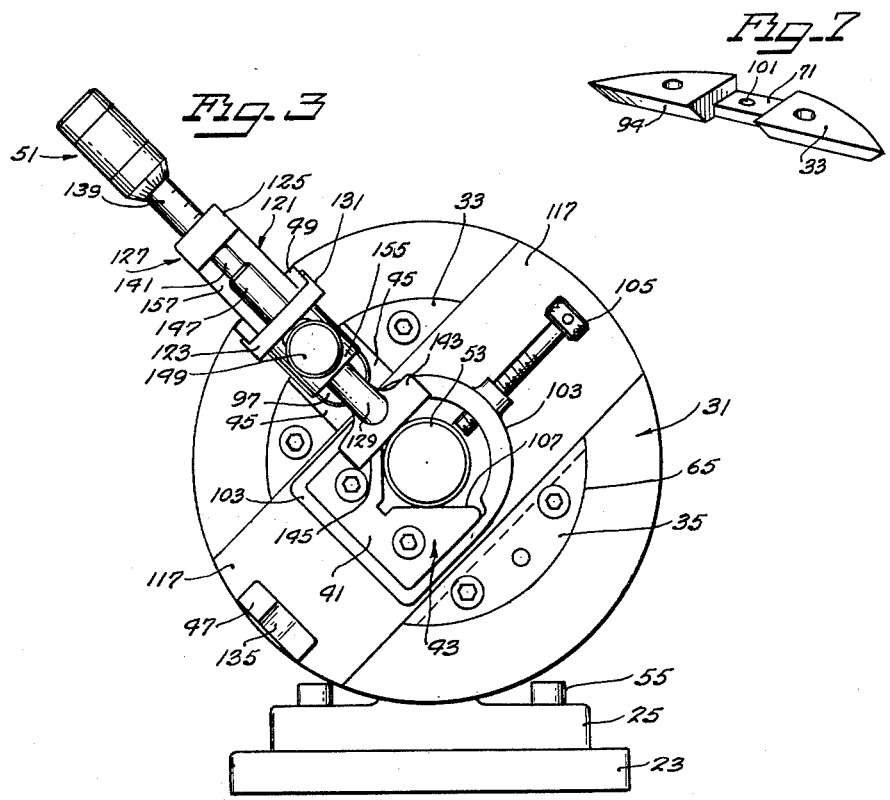
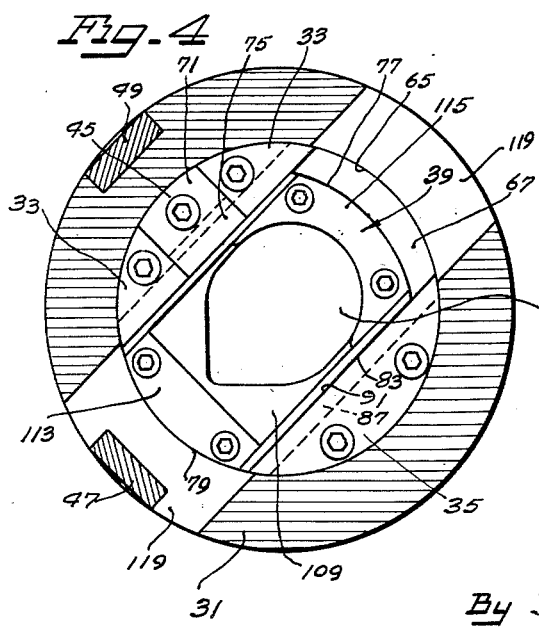
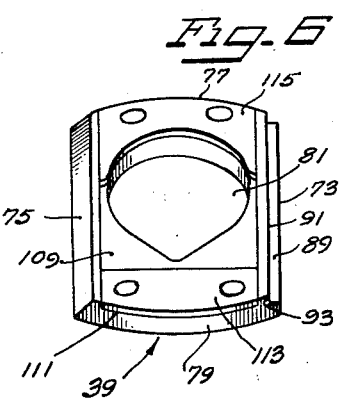
Inventor
JOHN S ATOLS
By Soans, Anderson, Luedeka & Fitch
Attys ns/us/3069818

United States Patent Office 3,069,818
Patented Dec. 25, 1962

3,069,818
CENTERING DEVICE
John S. Atols, 5009 W. Armitage Ave., Chicago, Ill.
Filed Nov. 27, 1959, Ser. No. 855,662
2 Claims. (Cl. 51—237)

This invention relates generally to clamping devices, and is more particularly directed to a rotatable work holder, such as a grinding fixture which is adapted to facilitate positoning of a clamped work piece at a selected position relative to the axis of rotation of the holder.

In the past, various rotatable work holders have been available for locating a clamped work-piece relative to the rotational axis of the work holder and for rotating the work-piece during various machining operations, as for instance, the grinding of a work-piece to an exact predetermined diameter, or the grinding of an eccentric stud at the end of a shaft. However, positioning of the work-piece at a selected location relative to the rotational axis of these previous holders was often a time consuming and somewhat unreliable procedure. This is particularly true when using the common dial type indicator to determine the concentric relation of the clamped piece to the supporting rotatable holder.

These problems have been overcome by the apparatus disclosed herein which includes measuring means detachably supported by the work holder and which is adapted, by a simple procedure, to accurately position a work-piece at a predetermined position relative to the rotational axis of the work holder. Accordingly, the principal object of the invention is the provision of a new and improved rotatable work holder.

Another object of the invention is the provision of a work holder including a work-clamping vise fixedly positionable at any point along a path extending radially from the rotational axis of the work holder, and including means for accurately locating the vise to center the work-piece or to locate the work-piece off center at a preselected distance.

A further object of the invention is the provision in a holder of an improved construction, which provides a fixed path for movement of the vise and which facilities clamping of the vise at any point along the path in accurate alignment with any other point therealong.

Other objects and advantages of the invention will be made known by reference to the following description and accompanying drawings in which:

FIGURE 1 is a perspective view illustrating a work holder embodying various features of the invention;

FIGURE 2 is a longitudinal sectional view of the work holder, taken generally along line 2—2 in FIGURE 1, with the chuck rotated, with the indicator mounted on the alternate support, and with certain parts broken away to more clearly illustrate the cooperation between the various components;

FIGURE 3 is an end view of the work holder shown in FIGURE 1 when looking from the left;

FIGURE 4 is a sectional view taken along line 4—4 of FIGURE 2, but with the chuck rotated, as in FIGURES 1 and 3, and with portions of the structure omitted;

FIGURE 5 is a perspective view of the clamping block incorporated in the disclosed work holder;

FIGURE 6 is a perspective view of the slide incorporated in the disclosed work holder; and FIGURE 7 is a perspective view of one of the guide blocks incorporated in the disclosed work holder.

The rotatable holder shown in FIGURE 1 is particularly adapted for clamping and locating a work-piece in predetermined relation to the holder's axis of rotation. As shown, the holder 21 includes a base 23 carrying a bracket 25 which supports a bearing 27 in which there is journalled an arbor 29 projecting rearwardly from a chuck 31. The chuck carries a pair of spaced blocks 33 and 35 forming a guideway 37 which extends in radially perpendicular relation to the rotational axis of the holder and in which there is received a slide 39 carrying the anchor block 41 of a vise 43. One of the guide blocks 33 carries a clamping block 45 by means of which the slide 39 can be fixed at any point along the guideway 37. Also carried by the chuck 31 are a pair of forked brackets 47 and 49 spaced 90 degrees apart at a common distance from the axis of rotation and individually adapted for the support of a locating element in the form of a micrometer type indicator or gage 51 used for determining the positioning of a clamped work-piece 53 relative to the axis of rotation of the chuck. By means of this arrangement, as will be more fully explained, the work-piece can be accurately positioned in alignment with, or at a selected point spaced from the center of the chuck.

Considering the construction in greater detail, the base 23 is a flat block adapted to be fixed on the bed of a machine, such as a grinder having the bracket 25 secured at one end thereof, by the illustrated machine screws 55. This bracket is of inverted "T" formation having the outer end of its stem enlarged to receive the bearing 27 with its center line parallel to the bottom of the base. The arbor 29 is journalled in the bearing 27 and has a flanged portion 57 at one end which is secured to the circular chuck 31 and at its other end, is provided with a knurled handle 59 for rotating the chuck.

The chuck 31 is essentially an annular ring having (see FIGURE 2) a circular collar 61 on its rear face forming a seat into which the flange 57 is received and secured by the machine screws 63. The other or front face of the ring is recessed to form a well 65 in which the vise 43 is slidably mounted. Secured within the well, in a plane prependicular to the bottom of the base 23, is a circular mounting plate 67 having a central, elongated opening 69 (see FIGURE 2) of generally tear shaped formation disposed with its long dimension along the direction of the guideway. Secured to the mounting block 67 in opposed spaced relation are the guide blocks 33 and 35 whose opposed parallel edges, together with the mounting block 45, define the radially extending guideway 37 in which the vise-bearing slide 39 is movable. Each of the guide blocks 33 and 35 is essentially a chordal segment, however, the block 35, seen particularly in FIGURE 7, includes a central cut-out 71 in which is located the clamping block 45, see FIGURE 5, by means of which the slide 39 can be fixed at any point along the guideway.

The slide 39, as seen especially in FIGURE 6, is a flat plate having sides 73 and 75 formed for mating engagement with the side edge of the guide blocks 35 and 33 and having convexly curved ends 77 and 79 which conform to the curvature of the well 65 but which are spaced apart a distance less than its diameter, thereby permitting travel of the slide 39 across the mounting plate. Located centrally in the slide is a tear shaped opening 81 having one end which conforms to the underlying end of the mounting plate opening 69 when the slide is positioned at one end of the guideway and whose other end conforms, when the slide is at the other end of the guideway, to the angular end of the elongated tear shaped opening in the mounting plate.

The mating side edges of the slide 39 and of the guide blocks 33 and 35 and clamping block 45 are especially constructed to afford accurate alignment of the slide at all points along the guideway 37. Specifically, these mating edges prevent the removal of the slide 39 from the guideway 37 and insure flush seating of the slide against the mounting plate 67 and against the guide block 35. In this connection, the edge 83 of the guide block 35 is stepped to provide a lengthwise lip 85 (see FIGURE 2) which defines an inner groove 87 between the guide block 35 and the mounting plate 67. In a complementary fashion, the mating side edge 73 of the slide 39 is also stepped to provide a lip 89 (see FIGURE 6), which enters into the groove 87, and a wall 91 which bears against the edge 83 of the lip. In addition, the juncture between the lip 89 and the wall 91 on the slide is recessed, as indicated at 93, to facilitate grinding of a sharp corner.

The edge 75 on the other side of the slide 39 is inclined outwardly in the direction of the mounting plate 67, as shown in FIGURE 2, while the mating side edge 94 of the guide block 33 and the clamping surface 95 of the clamping block 45 (see FIGURE 5) are inclined in a complementary fashion.

Clamping of the slide 39 in any position within the guideway 37 is obtained by tightening a screw 97 which passes through holes 99 and 101 in the clamping block 43 and mounting block 33, respectively, and which is threaded into the mounting plate 67. Such tightening causes the inclined clamping face 95 of the clamping block to apply inward and lateral pressure against the slide 39, thereby seating its rear surface flush against the mounting plate 67 and seating the wall 91 squarely against the edge 83 of the lip 85 on the guide block 35.

As noted previously, the slide 39 carries the vise 43, which includes the anchor block 41 and a removable clamp comprising a frame 103 surrounding the anchor block and a pressure screw 105. The anchor block 41 includes a V-shaped bed 107 and is fixed in a seat 109 on the slide 37 with the apex of the V-shaped bed extending in parallel relation to the bottom of the base and perpendicularly from the center line of the guideway 37. The seat 109 (see especially FIGURE 6) is formed by a channel 111 which extends lengthwise of the slide and by a pair of face plates 113 and 115 which are fixed in spaced opposed relation within the channel.

Extending around the anchor block 41 and across the face of the chuck 31 is a cover plate 117 which is interfitted at its ends in mating grooves 119 in the outer face of the chuck. The cover plate moves with the slide and prevents the entry of dirt or other particles within the guideway.

A work-piece may be readily clamped in the holder by placing it on the V-shaped bed 107 and by tightening the pressure screw 105 until the work-piece is tightly clamped. In the case of a cylindrical work-piece, its center line is located in a plane which also includes the central axis of the chuck.

Selective positioning of the work-piece 53 along the guideway 39 is obtained through the use of a micrometer type indicator 51 which can be secured to either of the forked brackets 47 and 49, the forked bracket 47 being fixed at one end of the guideway 39 and the bracket 49 being fixed at an equal distance from center of the chuck and at 90 degrees from the bracket 47.

The indicator 51 comprises a T-shaped frame 121 including a stem 123 which is engageable with the forked brackets and a cross bar 125 which carries a micrometer type measuring device 127 at one end and slidably receives a work-piece-engaging blade 129 at the other end.

Considering the structure in greater detail, the stem 123 includes a channel-shaped section 131 which is slidably engageable lengthwise along the inner face and side edges of the forked brackets 47 and 49. Threaded into the stem 123 is a locking screw 133 which is disposable through the central slot 135 of the forked brackets to snugly clamp the frame 121 to a selected bracket in aligned extending relation thereto.

The cross bar 125 is generally cylindrical having a central bore 137, and is secured to the stem 123 so that when the frame 121 is fixed to one of the supporting brackets, the bore 137 is positioned in radially perpendicular relation to the axis of rotation of the chuck.

Fixed at the outer end of the bore 137 is the sleeve 139 of a micrometer device 127 which has its spindle 141 disposed for inward movement axially of the bore 137.

The work-piece engaging blade 129 comprises a paddle 143 having a straight work-contacting edge 145 and a supporting rod 147 which extends perpendicularly to the edge 145 and is proportioned for slidable engagement within the bore 137. The end of the rod 147 within the bore is squared off for flush engagement with the micrometer spindle 141. Clamping of the rod 147 within the bore 137, and positioning of the work-contacting edge 145 of the paddle and in a plane perpendicular to the rotational axis of the chuck is provided by a clamp screw 149 and washer 151. The screw 149 is engaged in a threaded hole in the rod 147 and extends through a lengthwise slot 153 in the cross bar 125, the material surrounding the slot 153 being machined to provide a flat 155 against which the washer 151 is snugly engaged when tightening the screw 149 to clamp the work-engaging blade.

A portion of the cross bar 125 on the micrometer side of the stem is cut away, as indicated by the numeral 157, to permit viewing of the end of the micrometer spindle 141 and the adjacent, squared-off end of the rod 147.

In use, a work-piece to be clamped and centered, such as the cylindrical bar 53, is placed on the V-shaped bed 107 and then fixedly secured by tightening the pressure screw 105. When thus clamped, the center of the work-piece extends parallel to the base and perpendicularly from the center line of the guideway 37. In order to complete centering of the work-piece, the indicator 51 is first mounted on the forked bracket 49 facing the side of the guideway, the blade edge 145 is moved into engagement against the work-piece, and the micrometer spindle 141 is then seated against the end of the rod 147 to obtain a reading on the micrometer sleeve 139 which preferably indicates the distance from the edge of the blade to the center of the chuck but, at any rate, will give a relative indication of this distance.

The indicator 51 is then removed from the bracket 49 and fastened to the bracket 47 at the end of the guideway 37, with the micrometer sleeve 139 being set to the last reading obtained when in position on bracket 49. The rod 147 is then seated against the end of the spindle 141 and clamped. If desired, the rod 147 can be clamped when the indicator 51 is on the bracket 49 and when in work-engaging contact and can be retained in clamped condition for mounting on the bracket 47. Finally, the vise 43 is slid along the guideway until the work-piece contacts the edge 145 of the blade. When thus located, the center of the work-piece is aligned with the center of the chuck. The clamping screw 97 is then tightened to snugly engage the clamping block 45 against the slide 39, thereby fixing the vise 43 in place. The indicator can then be removed, if desired, during machine operation on the work-piece.

If it is desired to offset the work-piece some predetermined amount relative to the center of the chuck, as when grinding an eccentric stud at the end of a shaft, this can be readily accomplished by applying the desired offset dimension to the micrometer reading after mounting the indicator on the bracket 47 and before clamping the rod 147 of the work-engaging blade 129. The vise can then be slid along the guideway to engage the work-piece with the blade edge 145. When thus engaged, the vise is clamped in the off-set position.

Various changes and modifications may be made in the disclosed construction. Various features of the invention are set forth in the appended claims.

I claim:
1. A work holder comprising a base, a chuck rotatably mounted on said base about an axis parallel to said base and having a mounting surface perpendicular to said axis, a pair of guide blocks carried by said mounting surface in spaced parallel relation to each other to define, together with said mounting surface, a generally channel-shaped guideway extending radially of said chuck, a slide carried in said guideway, a work holding vise carried by said slide and formed for carrying a work-piece in parallel relation to said axis, one of said guide blocks having a guideway-defining edge with a lengthwise groove directed laterally outward from said guideway adjacent said mounting surface, the other of said guide blocks having a cut-out therein and a guideway-defining edge inclined outwardly of said guideway in the direction of said mounting surface, a clamping block located in said cut-out and having a clamping surface conforming with said guideway-defining edge of said other mounting block, said slide having one side edge with a lengthwise lip inserted within said groove, and having a second side edge inclined outwardly in the direction of said mounting surface in mating engagement with said inclined edge and said clamping surface, and fastening means for tightening said clamping block in a direction generally perpendicular to said mounting surface, whereby clamping pressure is applied to said slide in directions both normal to and laterally of said mounting surface so that said slide is seated, at any point along said path, flush against said mounting surface and flush against said guideway-defining edge of said one guide block, and means for locating said work-piece relative to said axis, said locating means comprising a pair of brackets carried by said chuck at equal distances from said axis and at 90 degrees apart, one of said brackets being mounted adjacent one end of said guideway, a frame selectively mountable on either of said brackets and having a bore therein, said bore being disposed in radially perpendicular relation to said axis when said frame is mounted on either of said brackets, a work-piece engaging member slidably carried within one end of said bore, and a micrometer device secured adjacent the other end of said bore, said micrometer device including a spindle movable axially inwardly of said bore for engagement with the adjacent end of said member to provide an indication of the location of said work-piece relative to said axis when said member is engaged with said work-piece.

2. A chuck rotatably mounted on a support for rotation about the chuck axis, a pair of guide blocks carried on the mounting face of said chuck in spaced, parallel relation so as to define with the mounting face a guideway, one of said guide blocks having a guideway defining edge of stepped configuration with the portion adjacent said mounting face being recessed with respect to the outer edge portion of said one block, the other of said guide blocks having a guideway defining edge which is inclined with respect to the mounting face of the chuck in outwardly converging relation to the chuck axis, said other guide block including an intermediate portion which is cut-out to provide a transverse recess adjacent the guideway defining edge, a clamping block located in said cut-out portion and having an inclined edge surface conforming with said inclined surface of said other guide block, a slide carried in said guideways and having opposite edges disposed in mating engagement with said guideway defining edges, and fastening means for tightening said clamping block in a direction generally perpendicular to said mounting face to thereby apply pressure to the inclined edge of said slide, so that the latter is securely seated against the guideway defining edge of said one guide block and held against movement in said guideway.

References Cited in the file of this patent

UNITED STATES PATENTS

| 1,696,660 | Werner | Dec. 25, 1928 |
| 1,748,672 | Groene | Feb. 25, 1930 |
| 2,369,645 | Bigarani et al. | Feb. 20, 1945 |
| 2,429,685 | Healy | Oct. 28, 1947 |
| 2,449,459 | Eckert | Sept. 14, 1948 |
| 2,600,824 | Zwick | June 17, 1952 |
| 2,670,545 | Kaminsk | Mar. 2, 1954 |
| 2,997,821 | Dixon et al. | Aug. 21, 1961 |

FOREIGN PATENTS

| 240,851 | Switzerland | May 1, 1946 |